April 7, 1959   R. E. UHLENHAUT   2,880,990
TORSION BAR SUSPENSION, PARTICULARLY FOR VEHICLES
Filed Oct. 18, 1952
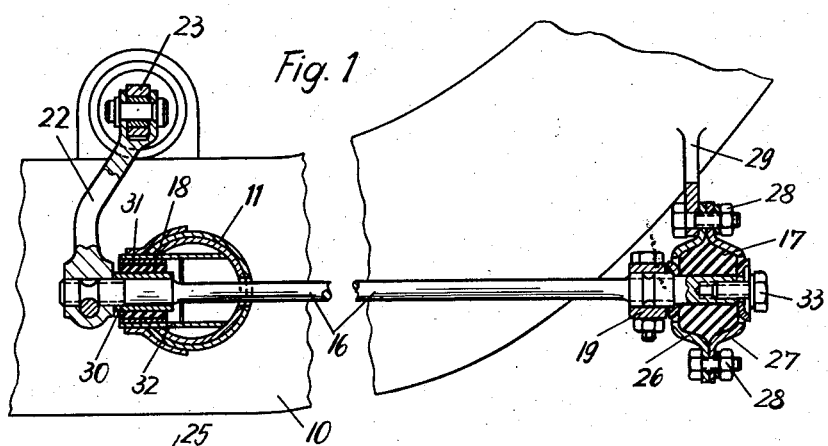
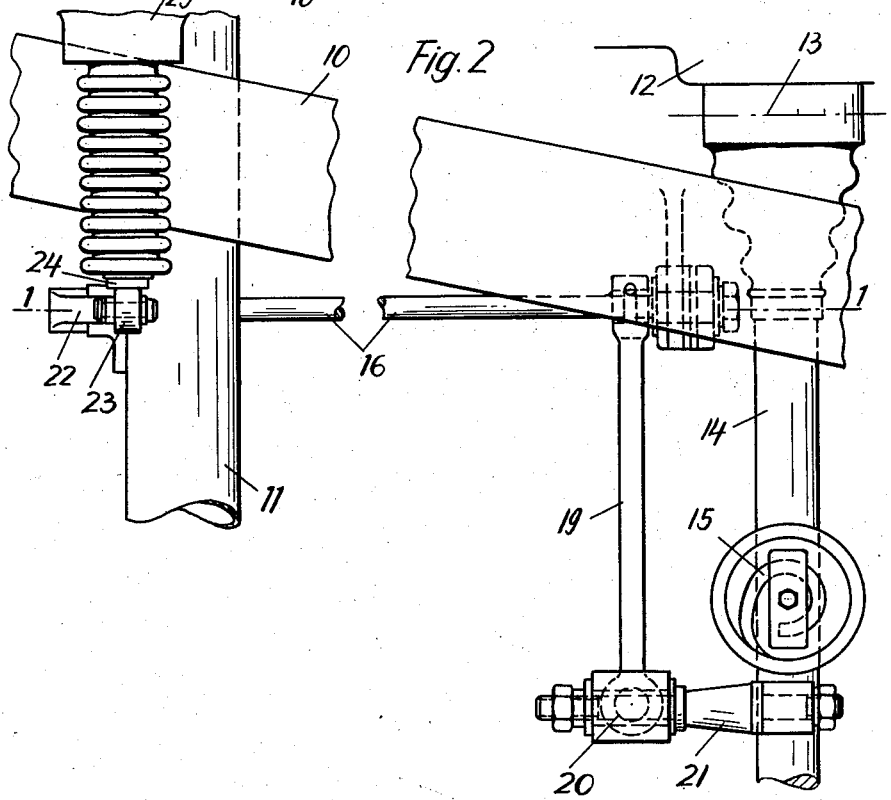
Inventor
Rudolf E. Uhlenhaut
By Wicke and Padlon
Attorneys

2,880,990
TORSION BAR SUSPENSION, PARTICULARLY FOR VEHICLES

Rudolf E. Uhlenhaut, Stuttgart, Germany, assignor to Daimler-Benz Aktiengesellschaft, Stuttgart-Unterturkheim, Germany Application October 18, 1952, Serial No. 315,517

Claims priority, application Germany October 18, 1951

7 Claims. (Cl. 267—22)

The present invention relates to a torsion bar suspension, and is particularly concerned with adjustable springs or auxiliary springs for motor vehicles.

It is an object of the present invention to avoid transmission of shocks and vibrations, which act on the road wheel, to the frame or body of the vehicle by way of the torsion bar.

It is another object of the present invention to avoid in an efficient and effective manner the transmission of noises between axle and the super-structure of the vehicle.

It is another object of the present invention to avoid distortions and warpings of the frame which bring about bending stresses in the torsion bar.

A still further object of the present invention resides in the particular arrangement and size of rubber bearing members in which the torsion bar is embedded or supported in such a way that the rubber bearing members are supported in a sufficiently stable manner accompanied by a reduction of annoying noises.

Further objects, features and advantages of the present invention will become more obvious from the following description when taken in connection with the accompanying drawing which shows for purposes of illustration one preferred embodiment of the present invention, and wherein:

Figure 1 is a sectional side view of a torsion bar suspension which serves as auxiliary springs in a transverse section along lines 1—1 in Figure 2, and Figure 2 is a plan view of the spring suspension of Figure 1.

Referring now more particularly to the drawing, wherein like reference numerals are used throughout the various views to designate like parts, reference numeral 10 designates a side member, interconnected with a tubular cross member 11 which form part of the frame or superstructure of the vehicle. An axle drive housing 12 which is not illustrated in detail, is supported or fastened to the frame or superstructure in any suitable manner. The axle drive housing may be fastened or supported on the frame elastically, if so desired. The semi-axles 14, which are connected with the axle drive housing 12 by means of joints 13, constitute guide means for the vehicle wheels and, accordingly, are linked with the rear wheels which are springingly supported against the frame by means of coil springs supporting themselves against the semi-axles as at 15.

In addition to the main spring suspension, there is furthermore provided a torsion bar or rod 16 which serves as an auxiliary or additional spring suspension. Torsion bar 16 is supported at the frame or superstructure in rubber bearing members 17 and 18. On the one hand, the torsion bar 16 is linked with an arm 21 suitably secured to the semi-axle 14 by means of a lever arm 19 and a vertical link member 20, the upper end of the vertical link member being pivotally connected to the arm 21 about the axis of the arm 21 and the lower end of the vertical link member 20 being pivotally connected to the arm 19 in any suitable manner about the vertical axis of the vertical link member 20 as viewed in Figure 2. On the other hand, torsion bar 16 is supported against the end of a ram or spring abutment member 24 by means of a lever arm 22 and a roller 23. Lever arm 22 is shorter than lever arm 19. The ram or spring abutment member 24 may be appropriately adjusted in any suitable manner by an adjusting device.

The rubber bearing 17 is relatively large in size and is held together axially by two sheet metal stampings 26 and 27, and may be pre-loaded if so desired. Stampings 26 and 27 are held together and secured to a sheet metal member 29 by means of common bolts 28. The sheet metal member 29 may be fastened to the side member 10 in any suitable manner, as by welding.

In contrast to the rubber bearing 17, the rubber bearing 18 has a relatively small radial dimension. The rubber bushing used in connection therewith is inserted between two metal bushings 30 and 31, and may be pressed therebetween with a pre-load, if so desired. Furthermore, the rubber bushing may be vulcanized on the bushing 30 and/or 31, if so desired. Bearing member 18 together with torsion bar 16 is inserted into support sleeve 32 provided at cross member 11.

The use of a bearing member 17 of relatively large dimension and of a bearing member 18 of relatively small dimension as well as possibly the difference in elasticity between the two bearing members 17 and 18 is based on the fact that they are subjected to different conditions in operation and that different functions are attributed to the different bearing members 17 and 18.

The bearing member 17, for example, is subjected to relatively small forces while the bearing member 18 is subjected to relatively large forces. Yet the bearing member 17 must be constructed to effectively absorb the relatively large torsional movements of the torsion rod 16 at the corresponding end thereof while the torsional movements of rod 16 in bearing member 18 are relatively small.

By utilizing the different bearing members 17 and 18 as described hereinabove, the different operating requirements are met in a most satisfactory manner.

The relatively small forces and relatively large torsional movements occurring in bearing member 17 are appropriately absorbed by the relatively large and relatively resilient construction thereof which permits the elastic bearing member 17 to participate in the torsional movements of the corresponding end of torsion rod 16 by reason of the large dimension of the bearing member 17 thereby obviating the need for any special friction members since the relative movement between the torsion rod 16 and the stamping 26, 27 is absorbed directly by the elastic bearing member 17. In addition thereto, such a construction of the bearing member 17 provides a most effective vibration and noise absorbing support for the torsion rod 16 at that point where the transmission of noise is particularly acute.

On the other hand, the relatively large forces which occur at the other end of the torsion rod 16 are appropriately absorbed thereat by a bushing-type bearing member 18 of relatively small radial dimension which is enclosed between metallic sleeves 30 and 31. Moreover, such a construction of bearing member 18 is also adequate in view of the relatively small torsional movements of rod 16 which occur thereat while at the same time providing a proper guiding action for the torsion rod 16 due to the small radial dimension of bearing member 18.

Axial alignment and fastening of the bearing member 17 is obtained by a bolt 33 provided on the face of the rubber bearing member 17. Bolt 33 threadably engages the torsion rod 16.

The invention is not restricted to the illustrated embodiment but is intended to be varied within the scope of the present invention, except as defined by the appended claims.

What is claimed is:

1. A vehicle spring suspension for springingly supporting a wheel on the vehicle superstructure comprising means for guiding said wheel with respect to said superstructure in the direction of the spring movement, a torsion rod additional to said guiding means performing no guiding function for said wheel, connecting means including lever arms of different lengths at the respective ends of said torsion rod connecting said torsion rod with said wheel and said superstructure respectively, and bearing means for said torsion rod fastened to said superstructure adjacent each of said lever arms each including an elastic bearing member made of rubber-like material, the elastic bearing member adjacent the lever arm connecting said torsion bar with said superstructure being of smaller radial dimension than the elastic bearing member adjacent the lever arm connecting said torsion bar with said wheel.

2. A spring suspension for springingly connecting two parts with respect to one another comprising a torsion rod, means including two lever arms spaced from each other along said torsion rod connecting said torsion rod with said parts, one of said lever arms being relatively long and the other of said lever arms being relatively short, elastic bearing means near said relatively short lever arm including a rubber bearing member of relatively little resilience, and elastic bearing means near said relatively long lever arm including a rubber bearing member of relatively great resilience.

3. A spring suspension for springingly connecting two parts with respect to one another comprising a torsion rod, means including two lever arms spaced from each other along said torsion rod connecting said torsion rod with said parts, one of said lever arms being relatively long and the other of said lever arms being relatively short, first elastic bearing means on said torsion rod near said relatively short lever arm including a rubber bushing intermediate two metal bushings and being of relatively small radial dimension and of relatively little resilience, and second elastic bearing means on said torsion rod near said relatively long lever arm including a rubber ring of relatively large radial dimension and of relatively great resilience.

4. A spring suspension for springing a vehicle wheel against the vehicle superstructure, comprising an axle member supporting said vehicle wheel, means connecting said axle member to said vehicle superstructure to enable said axle member with said vehicle wheel to move upwardly and downwardly with respect to said vehicle superstructure, a torsion bar arranged independently of said connecting means, a relatively short lever arm at the one end of said torsion bar, means including said relatively short lever arm supporting said torsion bar against said vehicle superstructure, a relatively long lever arm at the other end of said torsion bar, means connecting said relatively long lever arm to said vehicle wheel to support said torsion bar against said vehicle wheel, means supporting said torsion bar at the vehicle superstructure, comprising a rubber bushing of a relatively small radial dimension on said torsion bar adjacent said relatively short arm, and a rubber ring of a relatively large radial dimension on said torsion bar adjacent said relatively long lever arm.

5. A spring suspension for springingly supporting two parts with respect to each other comprising guiding means for guiding said parts in the direction of the spring movement thereof, a torsion rod in addition to said guiding means and arranged to be substantially unaffected by the guiding forces occurring in said guiding means, two lever arms spaced from each other along said torsion rod, means including said lever arms connecting said torsion rod with said parts, and bearing means on one of said parts for said torsion rod adjacent each of said lever arms, one of said bearing means including a rubber bushing at one end of said torsion rod and metallic sleeve members substantially encasing said rubber bushing therebetween, the other of said elastic bearing means including a rubber ring at the other end of said torsion rod having a relatively large radial dimension with respect to said rubber bushing, and means including sheet metal stampings axially holding together said rubber ring on said torsion rod, on the one hand, and securing said rubber ring at the vehicle superstructure, on the other.

6. A vehicle spring suspension for springingly supporting a wheel on the vehicle superstructure comprising means for guiding said wheel with respect to said superstructure in the direction of the spring movement, a torsion rod additional to said guiding means and performing no guiding function for said wheel, connecting means including lever arms at the respective ends of said torsion rod connecting said torsion rod with said wheel and said vehicle superstructure, and bearing means for said torsion rod fastened to said superstructure adjacent each of said lever arms, each including an elastic bearing member made of rubber-like material, the elastic bearing member adjacent the lever arm connecting said torsion bar with said superstructure being of smaller radial dimension than the elastic bearing member adjacent the lever arm connecting said torsion bar with said wheel, said superstructure of the vehicle including tubular frame members, said torsion rod passing at least through one hollow frame member, and said bearing means for at least one end of said torsion rod being arranged within said hollow frame member through which said torsion rod passes.

7. A spring suspension according to claim 1, furthermore comprising an adjusting mechanism, against which one of said lever arms supports itself at its end opposite said torsion rod including means for adjusting said one lever arm in the supporting direction.

References Cited in the file of this patent

UNITED STATES PATENTS

| | | |
|---|---|---|
| 2,082,509 | Rabe | June 1, 1937 |
| 2,165,033 | Dauben | July 4, 1939 |
| 2,210,485 | Hawkins | Aug. 6, 1940 |
| 2,219,140 | Olsen | Oct. 22, 1940 |
| 2,223,741 | Rabe | Dec. 3, 1940 |
| 2,226,047 | Borgward | Dec. 24, 1940 |
| 2,254,325 | Slack et al. | Sept. 2, 1941 |

FOREIGN PATENTS

| | | |
|---|---|---|
| 782,310 | France | Mar. 11, 1935 |
| 451,490 | Great Britain | Aug. 6, 1936 |